United States Patent
Pratte et al.

(10) Patent No.: US 11,920,062 B2
(45) Date of Patent: Mar. 5, 2024

(54) FUNCTIONALIZED POLYMER PARTICLES FOR USE AS TOUGHENING AGENT

(71) Applicant: CYTEC INDUSTRIES INC., Princeton, NJ (US)

(72) Inventors: James Francis Pratte, Wilmington, DE (US); Robin K Maskell, Phoenix, AZ (US); James Martin Griffin, Orange, CA (US); Judith Anne Elder, Tyne and Wear (GB)

(73) Assignee: CYTEC INDUSTRIES INC., Princeton, NJ (US)

( * ) Notice: Subject to any disclaimer, the term of this patent is extended or adjusted under 35 U.S.C. 154(b) by 260 days.

(21) Appl. No.: 17/551,777

(22) Filed: Dec. 15, 2021

(65) Prior Publication Data
US 2022/0106504 A1  Apr. 7, 2022

Related U.S. Application Data

(63) Continuation of application No. 14/718,584, filed on May 21, 2015, now Pat. No. 11,292,946.

(60) Provisional application No. 62/001,829, filed on May 22, 2014.

(51) Int. Cl.
| | | |
|---|---|---|
| C09J 171/00 | (2006.01) | |
| B32B 37/14 | (2006.01) | |
| B32B 38/08 | (2006.01) | |
| C08G 65/40 | (2006.01) | |
| C08G 65/48 | (2006.01) | |
| C08J 5/04 | (2006.01) | |
| C08J 5/24 | (2006.01) | |
| C08L 71/00 | (2006.01) | |
| C09J 163/00 | (2006.01) | |

(Continued)

(52) U.S. Cl.
CPC .............. *C09J 171/00* (2013.01); *B32B 37/14* (2013.01); *B32B 38/08* (2013.01); *C08G 65/4012* (2013.01); *C08G 65/48* (2013.01); *C08J 5/042* (2013.01); *C08J 5/243* (2021.05); *C08J 5/249* (2021.05); *C08L 71/00* (2013.01); *C09J 163/00* (2013.01); *B32B 2037/1253* (2013.01); *B32B 2038/0076* (2013.01); *B32B 2371/00* (2013.01); *C08G 2650/40* (2013.01); *C08J 2363/00* (2013.01); *C08J 2471/00* (2013.01); *Y10T 156/10* (2015.01)

(58) Field of Classification Search
CPC ........ B32B 2371/00; B32B 2038/0076; B32B 2037/1253; B32B 38/08; B32B 37/14; C09J 171/00; C09J 163/00
See application file for complete search history.

(56) References Cited

U.S. PATENT DOCUMENTS

| | | | | |
|---|---|---|---|---|
| 4,959,424 A | * | 9/1990 | Matzner | .................. C07C 45/46 528/125 |
| 2007/0246686 A1 | * | 10/2007 | Halahmi | .................. C08K 9/00 252/182.13 |

(Continued)

*Primary Examiner* — Vishal I Patel
(74) *Attorney, Agent, or Firm* — Thi Dang

(57) ABSTRACT

Composite materials and structural adhesives containing particles of functionalized polymers as a toughening agent. The particles are composed of functionalized polyaryletherketone (PAEK) polymer or copolymer thereof that contain chemical functional groups capable of reacting with a thermoset resin component to form covalent bonds.

6 Claims, 7 Drawing Sheets

(51) Int. Cl.
*B32B 37/12* (2006.01)
*B32B 38/00* (2006.01)

(56) References Cited

U.S. PATENT DOCUMENTS

2012/0107560 A1* 5/2012 Rogers ................ B32B 37/025
 428/323
2012/0263953 A1* 10/2012 Towle .................... D01F 6/665
 428/402

* cited by examiner

FUNCTIONALIZED POLYMER PARTICLES FOR USE AS TOUGHENING AGENT

CROSS-REFERENCE TO RELATED APPLICATIONS

The present application is a continuation of U.S. application Ser. No. 14/718,584, filed on May 21, 2015, which claims priority to U.S. provisional Application No. 62/001,829, filed on May 22, 2014, the entire content of each of these prior filed applications is explicitly incorporated herein by reference.

BACKGROUND

Fiber-reinforced polymer (FRP) composites have been used as high-strength, low-weight engineering materials to replace metals in aerospace structures such as primary structures of aircrafts. Important properties of such composite materials are high strength, stiffness and reduced weight.

Multiple layers of prepreg plies are commonly used to form structural composite parts that have a laminated structure. Delamination of such composite parts is an important failure mode. Delamination occurs when two layers de-bond from each other. Important design limiting factors include both the energy needed to initiate a delamination and the energy needed to propagate it.

A cured composite (e.g. prepreg layup) with improved resistance to delamination is one with improved Compression Strength After Impact (CAI) and fracture toughness ($G_{IC}$ and $G_{IIC}$).

CAI measures the ability of a composite material to tolerate damage. In the test to measure CAI, the composite material is subject to an impact of a given energy and then loaded in compression. Damage area and dent depth are measured following the impact and prior to the compression test. During this test, the composite material is constrained to ensure that no elastic instability is taking place and the strength of the composite material is recorded.

Fracture toughness is a property which describes the ability of a material containing a crack to resist fracture, and is one of the most important properties of a material for aerospace applications. Fracture toughness is a quantitative way of expressing a material's resistance to brittle fracture when a crack is present.

Fracture toughness may be quantified as strain energy release rate ($G_c$), which is the energy dissipated during fracture per unit of newly created fracture surface area. $G_c$ includes $G_{IC}$ (Mode 1—opening mode) or $G_{IIC}$ (Mode II—in plane shear). The subscript "IC" denotes Mode I crack opening, which is formed under a normal tensile stress perpendicular to the crack, and the subscript "IIC" denotes Mode II crack produced by a shear stress acting parallel to the plane of the crack and perpendicular to the crack front. The initiation and growth of a delamination is often determined by examining Mode I and Mode II fracture toughness.

CAI performance of fiber-reinforced polymer composites may be improved through two main technologies. The first technology involves the use of high-strength reinforcing fibers that have relatively high strain to failure. These fibers appear to absorb a high amount of energy without fracturing thereby redistributing the energy over a larger area of the composite laminate.

CAI performance of fiber-reinforced polymer composites may be improved by incorporating certain toughening particles into the interlaminar regions of a multilayer composite laminate. The "interlaminar region" refers to the region between two adjacent structural layers of reinforcement fibers in the composite laminate.

The presence of toughening particles in the composite laminate creates a resin rich interlayer which helps to contain the crack propagation in this interlayer region. The particles are hypothesized to create the spacing between the structural fiber layers as well as interact with the propagating crack to dissipate the absorbed energy from the impact event. Conventionally used toughening particles include cross-linked polyamide (Nylon 6, 6) particles, which can impart good toughness, adequate fluid resistance when they are incorporated into carbon fiber-reinforced prepregs, but being made of polyamide, they absorb water, and consequently, cause a significant reduction in hot/wet compressive properties. Amorphous thermoplastic particles such as polyphenylenoxide (PPO) can provide good toughness but has poor fluid resistance that could result in solvent stress cracking of the particles. Particles of polyphtalamide (PPA), which is a high heat resistance, semi-aromatic polyamide, can impart good $G_{IIC}$ performance but also absorbs water. Polyimide particles (e.g. P84™ from HP Polymer Inc.) have been used to improve notch properties but they also absorb water.

In some instances, combining three different types of particles may be needed to achieve the desired CAI and fracture toughness properties for aerospace applications. Multiple particle types that interact differently with the resin matrix in the composite have been shown to mitigate the limitations of one particle type. However, using several types of particles in a resin formulation raises the issue of non-uniform dispersion and mixing, as well as increases the manufacturing cost.

Toughening particles have also been incorporated into structural adhesives which are used in bonding composite parts. These particles are typically rubbers (CTBN, core shell), polyamides, and polyethersulfones to name a few that interact with an oncoming crack to absorb the fracture energy thereby toughening the bondline.

In light of the state of the art, there remains a need for toughening particles that could overcome the above mentioned drawbacks of conventional toughening particles. Particularly, it would be advantageous to obviate the need to use a blend of different types of particles to achieve the desirable CAI performance and fracture toughness in advanced composites such as those for aerospace applications.

SUMMARY

The present disclosure pertains to the use of functionalized polymer particles as a toughening agent for increasing the damage tolerance and fracture toughness of fiber-reinforced polymer composites. More specifically, the particles are composed of polyaryletherketone (PAEK) polymers or copolymers thereof that contain chemical functional groups which can react with thermoset resins such as epoxides, bismaleimides, benzoxazines, and blends thereof to form a covalent bond. In a preferred embodiment, the particles are functionalized with amine groups.

Another aspect of the present disclosure is related to the incorporation of the above mentioned functionalized particles in structural adhesives that are suitable for bonding composite parts.

DETAILED DESCRIPTION

Figure 1:
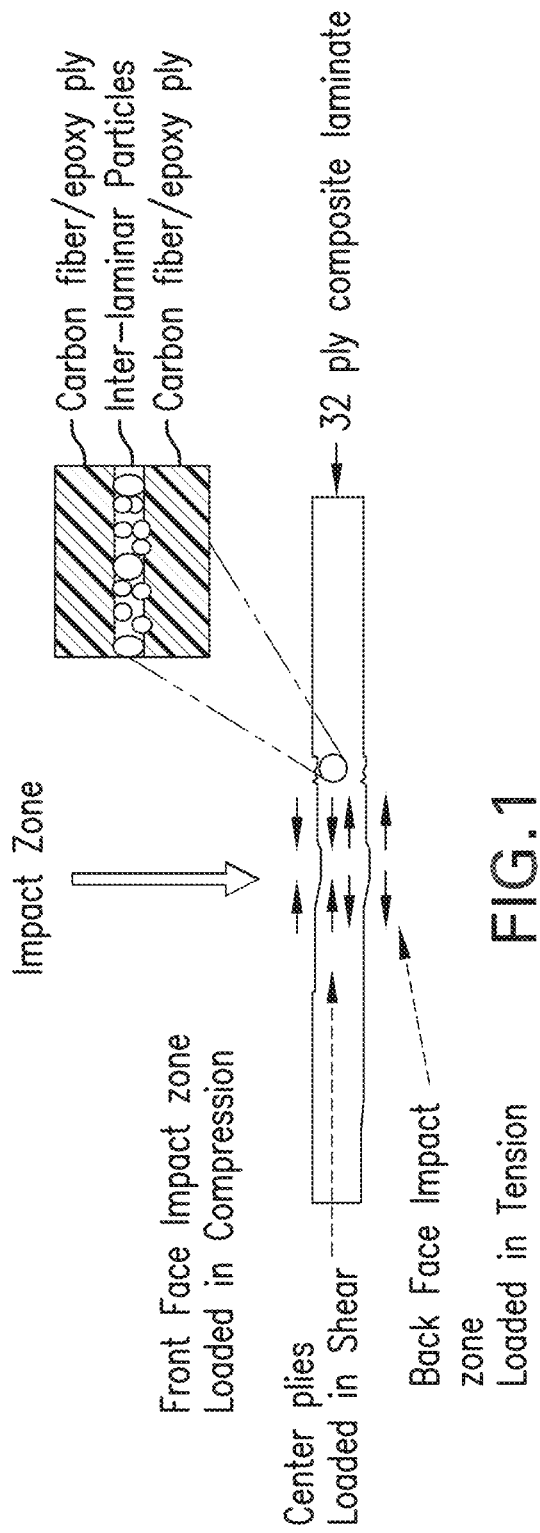
FIG. 1 illustrates an impact event on a particle-toughened carbon fiber/epoxy composite.

The functionalized polymer particles disclosed herein are particularly suitable as interlaminar particles in fiber-reinforced polymer composites. The incorporation of such particles imparts high toughness and high damage tolerance (i.e. CAI) properties to the cured composites whilst maintaining high hot/wet compressive and shear properties. FIG. 1 illustrates an impact event on a particle-toughened carbon fiber/epoxy composite. As can be seen in the force diagram, the interior plies are loaded primarily in shear much like that in a $G_{IIC}$ test. High $G_{IIC}$ performance has been correlated with reduced impact damage area and in turn improved CAI performance. Thus, it is desirable to have high $G_{IIC}$ performance along with low moisture pick-up in the toughening particles that would lead to higher hot/wet notch properties.

Earlier attempts of using finely ground polyetherketoneketone (PEKK) particles gave higher notch properties but no improvement was seen in fracture toughness and CAI performance. Notched properties, which can be measured as Filled Hole Tension and Filled Hole Compression (FHT, FHC), and Open Hole Tension and Open Hole Compression (OHT, OHC), relate to the ability of a given composite material to carry load once a hole is drilled on the load bearing region of the composite material itself. Without wishing to be bound by any theory, it is believed that the shape of and the chemical functional groups on the particles contribute to the improvements discussed above. Moreover, the functionalized thermoplastic particles are also suitable as toughening particles in structural adhesives that are used for bonding composite parts.

The functionalized particles contain chemical functional groups which can react with thermoset resins such as epoxides, bismaleimides (BMI), benzoxazines, and blends thereof to form covalent bonds. The term "functionalized" as used in this context means chemical groups on the particles, at least some of which have the potential to bond with some or all of the monomers in the thermoset formulation (e.g. epoxy, BMI, benzoxazine).

Preferably, the functionalized particles are particles of an amine-functionalized polyaryletherketone polymer or copolymer thereof. In one embodiment, the amine-functionalized polyaryletherketone polymer or copolymer thereof has a weight average molecular weight (Mw) of at least 8,000, preferably greater than 10,000, an inherent viscosity of at least 0.28 dl/g, and a glass transition temperature of at least 140° C. as measured by differential scanning calorimetry (DSC). The term "amine-functionalized" is intended to encompass polymers with one or more amine functional groups as end-groups. It also encompasses polymers in which the amine groups are substituents on the polymer chain, i.e. pendant to the backbone. Preferably, the polymers/copolymers are functionalized at the end groups.

The functionalized polyaryletherketones of the present disclosure are polymers containing the unit —Ar—O—Ar—C(=O)—, where Ar is an aromatic moiety. They are characterized by aryl groups that are linked via ether, carbonyl (ketone), sulphone or imide groups and include, but are not limited to the following:

Poly (ether ketone), i.e. PEK, a polymer consisting essentially of the repeat unit: —Ar—O—Ar—C(=O)—;

Poly (ether ketone ketone), i.e. PEKK, a polymer consisting essentially of the repeat unit: —Ar—O—Ar—C(=O)—Ar—C(=O)—;

Poly (ether ether ketone), i.e. PEEK, a polymer consisting essentially of the repeat unit: —Ar—O—Ar—O—Ar—C(=O)—;

Poly (ether ether ketone ketone), i.e. PEEKK, a polymer consisting essentially of the repeat unit: —Ar—O—Ar—O—Ar—C(=O)—Ar—C(=O)—;

Poly (ether ketone ether ketone ketone), i.e. PEKEKK, a polymer consisting essentially of the repeat unit: —Ar—O—Ar—C(=O)—Ar—O—Ar—C(=O)—Ar—C(=O)—;

Poly (ether ketone ketone), i.e. PEKK;

and combinations thereof;

wherein each Ar in the above repeat units is independently an aromatic moiety.

Each aromatic moiety (Ar) in the polymer repeating unit may be independently selected from substituted and unsubstituted mononuclear aromatic moieties (e.g. phenylene) and substituted and unsubstituted polynuclear aromatic moieties. The term "polynuclear" is considered to encompass fused aromatic rings such as naphthalene and non-fused rings such as biphenyl, etc. In some embodiments, Ar is phenylene (Ph), e.g. unsubstituted phenylene.

The phenylene and polynuclear aromatic moieties (i.e. "Ar") may contain substituents on the aromatic rings. Such substituents would be readily understood by the skilled person and should not inhibit or otherwise interfere with the polymerization reaction to any significant extent. Typical substituents may include, for example, phenyl, halogen (e.g. F, Cl, Br, I), ester, nitro, cyano and the like.

In cases where Ar is substituted, the substituents are preferably pendant to the chains, rather than in the backbone, i.e. not bonded to a carbonyl carbon atom of a ketone linkage nor to an oxygen atom of an ether linkage. Thus, in a particularly preferred aspect, the ketone linkages (i.e. the carbon atoms of the carbonyl group) are directly attached to carbon atoms, especially to carbon atoms of adjacent aromatic (i.e. to aromatic carbons). Similarly, the oxygen atoms of the ether linkages are preferably attached to carbon atoms, especially to aromatic carbon atoms of adjacent aromatic groups.

Homopolymers of the above repeat units or copolymers of the above repeat units with each other (e.g. PEKK-PEKEKK-PEKK) and with imide or sulphone units are encompassed. Copolymers include alternating, periodic, statistical, random and block copolymers.

The copolymer may have an aryletherketone repeat unit and one or more of the following repeat units:

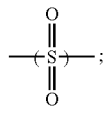

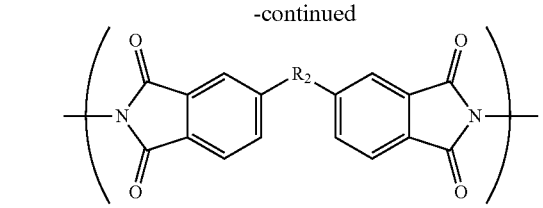

where

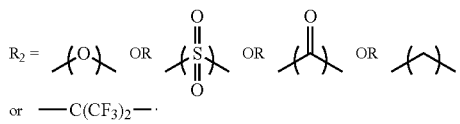

or —C(CF$_3$)$_2$—.

The particulate polymers disclosed herein are "functionalized" insofar as they contain one or more amine groups as end groups (i.e. at one or more ends of the polymer chain) and/or as pendant groups (i.e. at one or more positions along the polymer backbone).

The functional groups for the polymers are amines represented by the following formulas: —NR$_2$, —NRH or —NH$_2$, preferably —NRH or —NH$_2$, more preferably —NH$_2$, and derivatives thereof, where "R" is either an aliphatic or aromatic group. Where R is an aromatic group, it may be "Ar" as herein described (e.g. phenyl). Where R of —NR$_2$ or —NRH is an aliphatic group, it is preferably selected from alkyl groups, e.g. C1-C6 aliphatic groups, especially methyl or ethyl groups.

Preferably, the particulate polymers are terminated with an amine group, i.e. an amine group is found on at least one end of the polymer chain. Typically at least 50% of the end groups, i.e. the ends of the polymer chains are amine-functionalized, preferably at least 70%, especially preferably at least 85%, e.g. at least 95%. In certain embodiments, substantially all chain ends comprise an amine group.

In a further aspect, as an alternative to, or in addition to, amine-termination of the chain, the amine groups may be pendant to the polymer chain, i.e. they are substituents of the polymer's aromatic moieties. For example, 25% to 75%, or about 50% of the Ar groups are substituted with an amine group.

In some embodiments, the particulate polymers of the present disclosure are linear and terminated with a functional group. Particularly preferred compounds are those according to the following formulae (as well as imide- or sulphone-copolymers thereof):

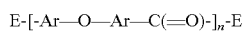

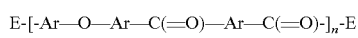

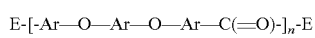

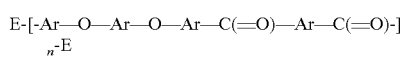

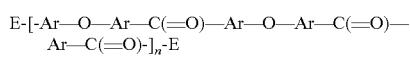

where n is an integer from 1 to 200, e.g. 15 to 200 or 20 to 200, or 30 to 150, preferably 30 to 60, e.g. around 40 or 50, and E is an amine functional group as herein described, e.g. NH$_2$.

In a preferred embodiment, the functionalized particles are particles of a polymer or copolymer represented by the following structure:

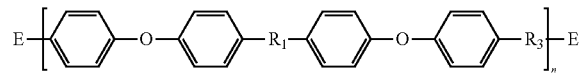

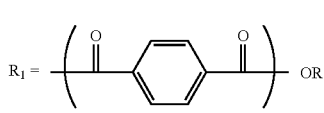

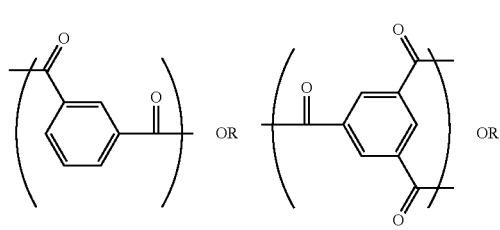

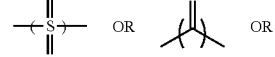

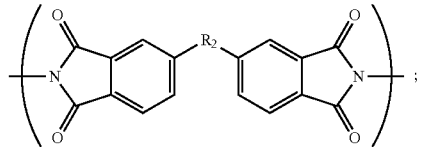

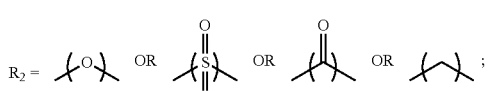

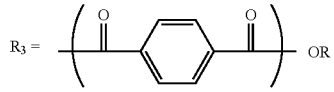

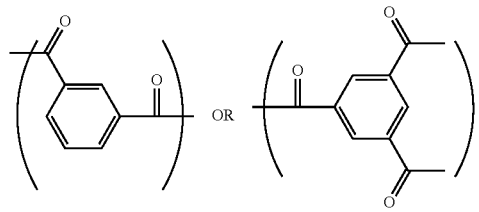

where E is an amine functional group (e.g. NH$_2$) or protected amine, and n is an integer from 15 to 200.

In the structure above, the polymer chain end groups (E) may be comprised either wholly or partially of an aromatic amine such as phenoxy aniline. Other end groups that may be present together with the amine functionalized end groups could be unreactive or reactive to the thermoset resin matrix for which the particles would be combined with.

In one embodiment, at least one of R1 and R3 in the structure above is the branch unit:

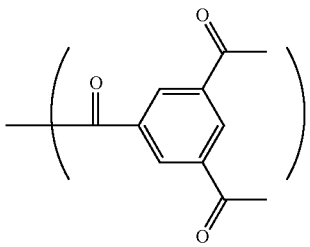

and the branched unit(s) is/are present in a molar percentage of 0.5% to 25%.

PAEK polymers may have different ether/ketone ratios in order to tailor the properties of the resulting materials. In any of the embodiments disclosed herein, $R_1$ may be a terephthaloyl group (T) and $R_2$ may be both terephthaloyl (T) and isophthaloyl group (I) and the ratio of T:I in the PAEK polymer backbone may range from 0:100 to 100:0. In any of the embodiments disclosed herein, R1 may contain the branching agents 1,3,5-triphenoxybenzene and/or 1,3,5-benzenetricarboxylic acid chloride at a level of 1 wt %-10 wt % of the weight of polymer, wherein "wt %" refers to weight percentage.

In one embodiment, the functionalized particles are particles of polyetherketoneketone (PEKK), polyetherketone (PEK), polyetherketonepolyetherketoneketone (PEK-PEKK), polyetheretherketone (PEEK), or blend thereof, and contain aromatic amine functional groups, such as phenoxyaniline.

In a preferred embodiment, the amine-functionalised polyaryletherketone polymer or copolymer thereof has a weight average molecular weight ($M_w$) of at least 8,000, preferably 26,000-162,000. The $M_w$ as disclosed herein can be determined by gel permeation chromatography (GPC).

The particulate amine-functionalised PAEK polymer or copolymer of the present disclosure has an inherent viscosity (IV) of at least 0.28 dl/g, particularly in the range of 0.4-1.7 dl/g, and in some embodiments, the IV is in the range of 0.6-1.5 dl/g. IV as discussed herein can be measured by using a conventional viscometer.

Preferably, the particulate amine-functionalised PAEK polymer or copolymer of the present disclosure has a glass transition temperature ($T_g$) of at least 140° C. as measured by differential scanning calorimetry (DSC), more specifically, in the range of 140-190° C., and in some embodiments, 158-178° C.

The functional groups of the functionalized particles are present on the outer surface and in the interior of the particles and are capable forming covalent bonds with the components of the curable thermoset resin system in which they are placed. The curable thermoset resin system into which the functionalized particles are added may include one or more of epoxides, bismaleimides, and benzoxazines that are capable of forming covalent bonds with the functionalized particles. Other components within the curable thermoset resin system that may form covalent bonds with the functionalized PAEK particles include amine curing agents if the functional groups are of the carboxylic acid type.

The PAEK polymers/copolymers disclosed herein are semi-crystalline thermoplastics which possess low moisture pick-up, high shear modulus, good solvent resistance, high glass transition temperature, good stability to oxidation, and low dielectric constants. These polymers also substantially retain these mechanical properties at elevated temperatures.

The functionalized polymer particles of the present disclosure can be produced through polymerization using an end cap that can be subsequently converted to a reactive end group.

Generally, the functionalized polymer particles could be made by polymerization using the following reagents: (a) at least one monomer; (b) a polymerizing agent; (c) a capping agent; and (d) other reagents.

Monomer

According to one embodiment, the monomer is represented by the following structure:

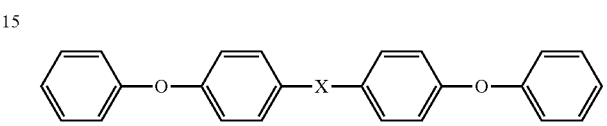

where X may be —C(O)—, —S(O$_2$)—, terephthaloyl group, isophthaloyl group, or an imide group with the following structure

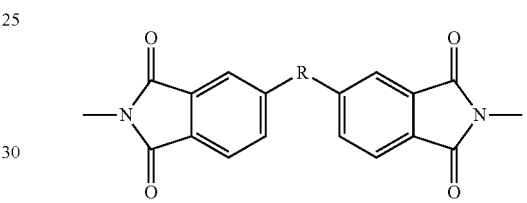

where R may be —C(O)—, —S(O$_2$)—, —O—, or simply a bond to make a biphenyl dianhydride group that reacted with phenoxyaniline groups.

Also contemplated are non-symmetric monomers and self-polymerizing monomers.

Polymerizing Agent

According to one embodiment the polymerizing agent is at least one of terephthaloyl chloride (TPC) and isophthaloyl chloride (IPC). This would be optional if a self-polymerizing monomer is used. Another embodiment would include at least one of TPC and IPC along with 1 wt %-10 wt % of benzenetricarboxylic acid chloride to make a branched and/or lightly cross linked polymer particle.

Capping Agent

According to one embodiment the capping agent has the general formula Z—Ar—O—Ph, where Z is a protected nucleophilic group, Ar is an aryl group, and Ph is phenyl.

As an example, Z may include —YH$_n$—R, where Y is nitrogen, oxygen or sulphur, n is the integer 0 or 1 and R is a leaving group, such as an acetyl, haloacetyl (e.g. trifluoroacetyl), and carbonate (e.g. t-Boc).

A preferred capping agent is:

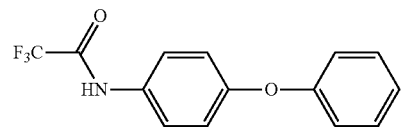

The trifluoroacetyl group is removed during the acid/base work-up conditions after polymerization to result in an amine end group that can react with the monomer components of a thermoset matrix.

Other Reagents

Other reagents may include one or more solvents (e.g. dichloromethane), Lewis acids (e.g. $AlCl_3$), and controlling agents (e.g. benzoic acid).

In an embodiment, the functionalized particles are obtained by a method that includes the step of:
(i) polymerizing a monomer system in a reaction medium containing:
   (a) a capping agent containing —$NR_2$, —NRH or a protected amine group, where R is either an aliphatic or aromatic group,
   (b) a Lewis acid, and
   (c) a controlling agent selected from an aromatic carboxylic acid, an aromatic sulphonic acid, and a derivative thereof; and
(ii) adjusting the ratio of controlling agent to monomers in the monomer system so as to control particle size distribution.

Functionalized polymer particles to be used as the polymer toughening particles in a thermoset matrix resin may have one dimension (smallest or largest dimension) being 75 microns or less. Such dimension could be achieved either directly from the functionalized particle synthesis or through a subsequent grinding operation. The particle's dimension can be measured by laser diffraction, e.g. using a Malvern Mastersizer particle size analyser.

In some embodiments, the functionalized polymer particles are substantially spherical in shape with an aspect ratio (R) of about 1 to 1.5 or rod shaped with an aspect ratio of 1.5 to 10, where R=a/b, "a" is the largest dimension, and "b" is the smallest dimension).

Composite Materials and Manufacturing Methods

The composite material disclosed herein is composed of reinforcing fibers impregnated with a matrix resin.

Matrix Resin

The curable matrix resin (or resin composition) for impregnating/infusing the reinforcement fibers is preferably a hardenable or thermosettable resin containing one or more uncured thermoset resins, which include, but are not limited to, epoxy resins, imides (such as polyimide or bismaleimide), vinyl ester resins, cyanate ester resins, isocyanate modified epoxy resins, phenolic resins, furanic resins, benzoxazines, formaldehyde condensate resins (such as with urea, melamine or phenol), polyesters, acrylics, hybrids, blends and combinations thereof.

Suitable epoxy resins include polyglycidyl derivatives of aromatic diamine, aromatic mono primary amines, aminophenols, polyhydric phenols, polyhydric alcohols, polycarboxylic acids. Examples of suitable epoxy resins include polyglycidyl ethers of the bisphenols such as bisphenol A, bisphenol F, bisphenol S and bisphenol K; and polyglycidyl ethers of cresol and phenol based novolacs.

Specific examples are tetraglycidyl derivatives of 4,4'-diaminodiphenylmethane (TGDDM), resorcinol diglycidyl ether, triglycidyl-p-aminophenol, triglycidyl-m-aminophenol, bromobisphenol F diglycidyl ether, tetraglycidyl derivatives of diaminodiphenylmethane, trihydroxyphenyl methane triglycidyl ether, polyglycidylether of phenol-formaldehyde novolac, polyglycidylether of o-cresol novolac or tetraglycidyl ether of tetraphenylethane.

Commercially available epoxy resins suitable for use in the host matrix resin include N,N,N',N'-tetraglycidyl diamino diphenylmethane (e.g. MY 9663, MY 720, and MY 721 from Huntsman); N,N,N',N'-tetraglycidyl-bis(4-aminophenyl)-1,4-diiso-propylbenzene (e.g. EPON 1071 from Momentive); N,N,N',N'-tetraclycidyl-bis(4-amino-3,5-dimethylphenyl)-1,4-diisopropylbenzene, (e.g. EPON 1072 from Momentive); triglycidyl ethers of p-aminophenol (e.g. MY 0510 from Hunstman); triglycidyl ethers of m-aminophenol (e.g. MY 0610 from Hunstman); diglycidyl ethers of bisphenol A based materials such as 2,2-bis(4,4'-dihydroxy phenyl) propane (e.g. DER 661 from Dow, or EPON 828 from Momentive, and novolac resins preferably of viscosity 8-20 Pa·s at 25° C.; glycidyl ethers of phenol novolac resins (e.g. DEN 431 or DEN 438 from Dow); di-cyclopentadiene-based phenolic novolac (e.g. Tactix 556 from Huntsman); diglycidyl 1,2-phthalate (e.g. GLY CEL A-100); diglycidyl derivative of dihydroxy diphenyl methane (Bisphenol F) (e.g. PY 306 from Huntsman). Other epoxy resins include cycloaliphatics such as 3',4'-epoxycyclohexyl-3,4-epoxycyclohexane carboxylate (e.g. CY 179 from Huntsman).

Generally, the curable matrix resin contains one or more thermoset resins in combination with other additives such as curing agents, curing catalysts, co-monomers, rheology control agents, tackifiers, inorganic or organic fillers, thermoplastic and/or elastomeric polymers as toughening agents, stabilizers, inhibitors, pigments, dyes, flame retardants, reactive diluents, and other additives well known to those skilled in the art for modifying the properties of the matrix resin before or after curing.

Aside from the functionalized PAEK particles, other toughening agents may be added to the curable resin composition. Other toughening agents include, but are not limited to, homopolymers or copolymers either alone or in combination of polyamides, copolyamides, polyimides, aramids, polyketones, polyetherketones (PEK), polyetherimides (PEI), polyetheretherketones (PEEK), polyetherketoneketone (PEKK), polyethersulfones (PES), polyetherethersulfones (PEES), polyesters, polyurethanes, polysuphones, polysuphides, polyphenylene oxide (PPO) and modified PPO, poly(ethylene oxide) (PEO) and polypropylene oxide, polystyrenes, polybutadienes, polyacrylates, polymethacrylates, polyacrylics, polyphenylsulfone, high performance hydrocarbon polymers, liquid crystal polymers, elastomers and segmented elastomers.

The curing agent is suitably selected from known curing agents, for example, aromatic or aliphatic amines, or guanidine derivatives. An aromatic amine curing agent is preferred, preferably an aromatic amine having at least two amino groups per molecule, and particularly preferable are diaminodiphenyl sulphones, for instance where the amino groups are in the meta- or in the para-positions with respect to the sulphone group. Particular examples are 3,3'- and 4-,4'-diaminodiphenylsulphone (DDS); methylenedianiline; bis(4-amino-3,5-dimethylphenyl)-1,4-diisopropylbenzene; bis(4-aminophenyl)-1,4-diisopropylbenzene; 4,4'methylenebis-(2,6-diethyl)-aniline (MDEA from Lonza); 4,4'methylenebis-(3-chloro, 2,6-diethyl)-aniline (MCDEA from Lonza); 4,4'methylenebis-(2,6-diisopropyl)-aniline (M-DIPA from Lonza); 3,5-diethyl toluene-2,4/2,6-diamine (D-ETDA 80 from Lonza); 4,4'methylenebis-(2-isopropyl-6-methyl)-aniline (M-MIPA from Lonza); 4-chlorophenyl-N,N-dimethyl-urea (e.g. Monuron); 3,4-dichlorophenyl-N,N-dimethyl-urea (e.g. DIURON™) and dicyanodiamide (e.g. AMICURE™ CG 1200 from Pacific Anchor Chemical).

Suitable curing agents also include anhydrides, particularly polycarboxylic anhydrides, such as nadic anhydride, methylnadic anhydride, phthalic anhydride, tetrahydrophthalic anhydride, hexahydrophthalic anhydride, methyltetrahydrophthalic anhydride, endomethylenetetrahydrophtalic anhydride, and trimellitic anhydride. The addition of catalyst(s) in the curable matrix resin is optional, but the use of such may increase the cure rate and/or reduce the cure temperatures, if desired.

The curable matrix resin at the interlaminar region is also a hardenable or thermosettable resin containing one or more uncured thermoset resins of the type discussed above. In certain embodiments, the curable matrix resin at the interlaminar region is the same as the matrix resin in the region containing the reinforcement fibers. In other embodiments, the resin at the interlaminar region is different from the matrix resin in the region containing the reinforcement fibers.

Reinforcement Fibers

For fabricating high-performance composite materials and prepregs, suitable reinforcing fibres are but not limited to fibers having a high tensile strength, preferably greater than 500 ksi (or 3447 MPa). Fibers that are useful for this purpose include carbon or graphite fibres, glass fibres and fibres formed of silicon carbide, alumina, boron, quartz, and the like, as well as fibres formed from organic polymers such as for example polyolefins, poly(benzothiazole), poly(benzimidazole), polyarylates, poly(benzoxazole), aromatic polyamides, polyaryl ethers and the like, and may include mixtures having two or more such fibres. Preferably, the fibers are selected from glass fibers, carbon fibers and aromatic polyamide fibers, such as the fibers sold by the DuPont Company under the trade name KEVLAR. The reinforcement fibers may be used in the form of discontinuous or continuous tows made up of multiple filaments, as continuous unidirectional or multidirectional tapes, or as woven, non-crimped, or nonwoven fabrics. The woven form may be selected from plain, satin, or twill weave style. The non-crimped fabric may have a number of plies and fiber orientations.

Fibers may be sized or unsized. Fibers may be present at a content of 5% to 35% by weight, preferably at least 20%, based on the total weight of the composite material. For structural applications, it is preferred to use continuous fibers for example glass or carbon, especially at 30% to 70% by volume, more especially 50% to 70% by volume.

Manufacturing of Composite Laminates and Parts

To form a composite part, a plurality of curable, flexible prepreg plies may be laid up on a tool in a stacking sequence to form a prepreg layup. The prepreg plies within the layup may be positioned in a selected orientation with respect to one another, e.g. 0°, ±45°, 90°, etc. Prepreg layups may be manufactured by techniques that may include, but are not limited to, hand lay-up, automated tape layup (ATL), advanced fiber placement (AFP), and filament winding.

Each prepreg is composed of a sheet or layer of reinforcing fibers that has been impregnated with a matrix material within at least a portion of their volume. In one embodiment, the prepreg has a fiber volume fraction between about 0.50 to 0.60 on the basis of the total volume of the prepreg.

The prepreg used for manufacturing aerospace structures is usually a resin-impregnated sheet of unidirectional reinforcing fibres, typically, carbon fibers, which is often referred to as "tape" or "unidirectional tape" or "uni-tape". The prepregs may be fully impregnated prepregs or partially impregnated prepregs. The matrix resin impregnating the reinforcement fibers may be in a partially cured or uncured state.

Typically, the prepreg is in a pliable or flexible form that is ready for laying up and molding into a three-dimensional configuration, followed by curing into a final composite part. This type of prepregs is particularly suitable for manufacturing load-bearing structural parts, such as wings, fuselages, bulkheads and control surfaces of aircrafts. Important properties of the cured prepregs are high strength and stiffness with reduced weight.

According to one embodiment, a specific amount of functionalized PAEK toughening particles is mixed with a curable resin composition prior to impregnation of reinforcement fibers (i.e. prior to the prepreg manufacturing). In this embodiment, a resin film is manufactured first by coating the particle-containing resin composition onto a release paper. Next, one or two of such resin film is/are laminated onto one or both sides of a layer of reinforcement fibers (e.g. web of unidirectional fibers) under the aid of heat and pressure to impregnate the fibers, thereby forming a fiber-reinforced polymer layer (or prepreg ply) with specific fiber areal weight and resin content. During the laminating process, the toughening particles are filtered out and remain external to the fiber layer due to the fact that the size of the particles is larger than the spacing between the fiber filaments. The resulting prepreg ply contains a structural fiber-reinforced layer adjacent to one or two layers of matrix resin in which the toughening particles are embedded. Subsequently, when two or more prepreg plies containing toughening particles therein are laminated one on top of the other via a laying up process, the toughening particles are positioned in the interlaminar region between two adjacent fiber layers. In this embodiment, the matrix resin at the interlaminar region (without polymeric toughening particles) is the same as the matrix resin contained in the structural fiber-reinforced layer and contains uniformly dispersed carbon nanomaterials.

In a second embodiment, a curable matrix resin containing toughening particles is coated onto a release paper to form a resin film. This resin film is then brought into contact with one side of a fiber layer (e.g. web of unidirectional fibers). Upon application of pressure, the resin film impregnates the fibers and leaves a little or no resin on the external surfaces of the fiber layer. Subsequently, a film of curable resin containing toughening particles is laminated to an exposed outer surface of the resin-impregnated fiber layer. The curable resin carrying the toughening particles may be the same as or different from the matrix resin impregnating the reinforcement fibers. As a result, a particle-containing resin layer remains outside of the impregnated fiber layer and does not further impregnate the fibers. A plurality of such structures are laminated together to form a composite structure with toughening particles positioned in the interlaminar regions.

In another embodiment, two films of curable matrix resin without toughening particles are laminated to two opposing surfaces of a fiber layer. The resin films impregnate the fibers and leave little or no resin on the external surfaces of the fiber layer, resulting in resin-impregnated fiber layer. Subsequently, two films of curable resin containing toughening particles are brought into contact with opposing surfaces of the resin-impregnated fiber layer to form a sandwich structure. Such approach tends to produce a well-defined and regular interlaminar region in the cured laminate.

Curing of the composite material or prepreg layup disclosed herein is generally carried out at elevated temperature up to 200° C., preferably in the range of 170° C.-190° C., and with use of elevated pressure to restrain deforming effects of escaping gases, or to restrain void formation, suitably at pressure of up to 10 bar (1 MPa), preferably in the range of 3 bar (0.3 MPa) to 7 bar (0.7 MPa). Preferably, the cure temperature is attained by heating at up to 5° C./min, for example 2° C./min to 3° C./min and is maintained for the required period of up to 9 h, preferably up to 6 h, for example 2 h to 4 h. The use of a catalyst in the matrix resin may allow even lower cure temperatures. Pressure is released throughout, and temperature is reduced by cooling at up to 5° C./min, for example up to 3° C./min. Post-curing at temperatures in the range of 190° C. to 350° C. and atmospheric pressure may be performed, employing suitable heating rates to improve the glass transition temperature of the matrix resin.

The terms "cure" and "curing" as used herein may include polymerizing and/or cross-linking processes. Curing may be performed by processes that include, but are not limited to, heating, exposure to ultraviolet light, and exposure to radiation.

Applications

The composite materials disclosed herein are applicable to the manufacture of structural components for aerospace applications, including airplanes, and automotive applications, including automotive vehicles and railroad. For examples, the composite materials may be used for fabricating primary and secondary aircraft structures, space and ballistics structures. Such structural components include composite wing structures. The composite materials disclosed herein also find utility in building and construction applications, as well as other commercial applications. Notably, the composite materials are particularly suitable for the fabrication of load-bearing or impact-resisting structures.

Structural Adhesives

Structural adhesives have been conventionally used for structural bonding in the manufacturing of structural parts that demand stringent mechanical requirements such as automobile and aircraft body parts. The structural adhesives for aerospace application must have the durability to withstand the harsh environmental conditions. Generally, heat-curable epoxy adhesives are used as structural adhesives.

The functionalized PAEK particles discussed above may be incorporated into curable adhesive compositions that are based on thermoset resins, e.g. epoxy, which are useful for bonding of various composite or metal substrates. Moreover, the functionalized particles in combination with other components in the adhesive composition could provide improved lap shear strength in hot/wet conditions.

The preferred adhesive composition is based on epoxy resins, which may be selected from those discussed above for the matrix resin of composites. Furthermore, it is preferred that the epoxy resin has a plurality of epoxy groups per molecule, i.e. multifunctional epoxies. In one embodiment, a plurality of different multifunctional epoxies is present in the adhesive composition. The epoxy resins are not used alone, but are combined with suitable curing agents, catalysts, rheology control agents, tackifiers, particulate fillers (e.g. fumed silica), elastomeric toughening agents, soluble thermoplastics, reactive diluents, and other additives well known to those skilled in the art.

EXAMPLES

Synthesis of Functionalized PEKK Polymer Particles

Example 1: Method for the Production of 1,4-(100:0) PEKK with Terminal $NH_2$ Functionality, 5% Out of Balance The reaction vessel was a glass, round bottomed, jacketed five litre reaction vessel with a bottom outlet and four baffles. Dichloromethane (2500 ml) was placed in the reaction vessel which was fitted with an overhead stirrer with an anchor head plus two intermediate paddles set at 90°, a solids inlet, a nitrogen inlet and a thermocouple. The temperature of the vessel was controlled by a Julabo external cooler/heater unit and was logged using Julabo EasyTemp software.

The vessel was purged with nitrogen and the dichloromethane cooled to −20° C. with stirring at 200 rpm, this stirring rate was used throughout the addition of all the reactants. The nitrogen purge was removed during the solid additions but reconnected during longer cooling periods. Aluminium chloride ($AlCl_3$) (764.8 g; 5.74M) was added to the cooled dichloromethane resulting in a small temperature increase. On cooling back to −20° C., benzoic acid (292.96 g; 2.399M) was added slowly to the $AlCl_3$ slurry such as to maintain the temperature of the slurry bellow −10° C. The dichloromethane slurry developed a yellow colour due to the aluminium chloride; the majority of it remained at the bottom of the vessel. The reaction mixture was then allowed to cool back to −20° C.

Maintaining the reaction mixture below −5° C. 1,4-bis(4-phenoxybenzoyl)benzene (EKKE) 265.99 g; 0.5653M) was carefully added in portions. At this point the mixture turned bright opaque orange. The remaining monomer was transferred by washing with approximately 4×50 ml (200 ml) portions of dichloromethane. Terephthaloyl chloride (TPC) (120.81 g; 0.5951M) was carefully added at a rate so as not to allow the mixture to rise above −10° C. The terephthaloyl chloride residues were transferred into the vessel by washing with approximately 200 ml dichloromethane in three portions.

Lastly the end-capper ("$CF_3$-EC"), 2,2,2-Trifluoro-N-(4-phenoxyphenyl) acetamide (16.69 g; 0.0596M) obtainable from Chem Bridge Corporation, SanDiego, USA and purified prior to use was added with its washings, together with the remaining 100 ml of dichloromethane. The stirrer speed was increased to 500 rpm and maintained over the reaction time. The reaction mixture was slowly warmed to 5° C. then after 10 minutes to 20° C., where it was kept constant throughout the reaction time. After approximately 30 minutes all of the solids had dissolved forming an orange-red solution. After this point, dispersed polymer particles began to form. The reaction mixture was stirred rapidly for five hours. Sometimes it is necessary to add an additional 500 ml of dichloromethane to replace material that evaporates during the reaction. If the reaction is carried out in a pressurized vessel this will not be necessary. During this phase the nitrogen purge was replaced with a trap to collect and neutralize the hydrogen chloride evolved during the reaction.

The reaction mixture was removed from the reaction vessel and isolated by vacuum filtration through a sinter. The orange solid was transferred to and decomplexed in approximately three litres of iced deionised water with stirring to produce a white particulate product. During decomplexing, the mixture should not reach greater than 5° C. The filtrate is also poured into iced water for decomplexing and disposal. The polymer remains in deionised water until workup. Prior to workup, the polymer particles should be entirely white, with no orange residues.

Workup procedures are typically carried out using a stirrer hotplate. Constant stirring is achieved with a large magnetic stirrer bar. A representative workup procedure for a PEKK polymerization carried out in a one litre reactor is as follows:

Stand/stir in deionised water overnight at room temperature.

Filtered and slowly added to 1.5 litres of stirred, hot deionised water to remove the residual dichloromethane.

100 ml concentrated hydrochloric acid added, boiled for 1 hour, filtered, washed with 500 ml deionised water, filtered.

Slurry in 2 litres of deionised water, boiled for 1 hour, filtered, washed with 500 ml deionised water, filtered.

Repeat the above

Slurry in 2 litres of deionised water made to pH13 with ammonia solution (~30 ml), boiled for 1 hour, filtered, washed with 500 ml deionised water, filtered Slurry in 2 litres deionised water, boiled for 1 hour, filtered, washed with 500 ml deionised water, filtered Pale cream PEKK powder isolated.

During this process the trifluoroactetyl protecting groups are removed from the end-capper leaving free terminal amine functionality.

The powder was first dried at 120° C. overnight, or until dry, in an air oven. The powder was then re-dried at 200° C. overnight in a vacuum oven where the oven was continuously evacuated.

Dry yield ~270 g: 80% yield. The process produces a reasonable quantity of very fine particles and much of this is lost during the filtration steps.

The inherent viscosity (IV) of the resultant polymer was 0.85 dl/g. $T_g$ was 182° C.; $T_m$ (melting temperature) was 396° C.

Example 2: Method for the Production of 1,4:1,3—(80:20) PEKK with Terminal $NH_2$ Functionality, 5% Out of Balance This was carried out in exactly the same manner as example 1 but where the quantities of terephthaloyl (TPC) and Isophthaloyl (IPC) chlorides were 73.69 g, 0.3630M and 47.12 g 0.2321M respectively.

The IV of the resultant polymer was 0.81 dl/g; $T_g$ was 165° C.; $T_m$ was 355° C.

Example 3: Method for the Production of 1,4;1,3—(60:40) PEKK with Terminal NH2 Functionality 5% Out of Balance This was carried out in exactly the same manner as Example 1 but where the quantities of TPC and IPC chlorides were 26.58 g, 0.1309M and 94.23 g 0.4642M respectively.

The IV of the resultant polymer was 0.83 dl/g; $T_g$ was 158° C.

Example 4: Method for the Production of 1,4;1,3—(80:20) PEKK with Terminal $NH_2$ Functionality 5% Crosslinked, 5% Out of Balance This was carried out using the same procedure described in Example 1 but using the following reagents:

| | |
|---|---|
| EKKE | 267.88 g (0.5693M) |
| TPC | 68.39 g (0.3369M) |
| IPC | 45.67 g (0.2249M) |
| 1,3,5 Benzenetricarbonyl chloride | 5.25 g (0.025M) |
| Benzoic acid | 289.16 g (2.37M) |
| Aluminium trichloride | 750.43 g (5.63M) |
| $CF_3$ – EC | 16.84 g (0.0599M) |

Note:
This is on the basis of end group concentration. Total acid chloride end group concentration was (0.3369 + 0.2249) × 2 + 0.025 × 3 = 1.1986. 5% Out of balance was 0.95 × 1.1986 = 1.1387 or 0.5693M of EKKE = 267.88 g. Required $CF_3$ – EC was 1.1986 – 1.1387 = 0.0599M = 16.85 g.

The IV of the resultant polymer was 1.5 dl/g; $T_g$ was 166° C.; $T_m$ was 352° C.

Example 5—Method for the Production of $NH_2$ End Capped (100:0) PEKK—EIEIE 10% Random Copolymer Dichloromethane was placed in a reaction vessel fitted with an overhead stirrer. The temperature of the vessel was controlled by an external cooler/heater unit.

The vessel was purged with nitrogen and the dichloromethane allowed to cool to −20° C. with stirring at 200 rpm. The mixture in the reaction vessel was stirred constantly at a medium rate of approximately 200 rpm during the following additions. The nitrogen purge was removed during the additions but reconnected during longer cooling periods. Aluminium chloride (609.64 g) was added, followed by benzoic acid (218.24 g), not allowing the mixture to rise above −10° C. due to the exotherms. The dichloromethane developed a yellow colour due to the aluminium chloride, the majority of it remained at the bottom of the vessel. The reaction mixture was then allowed to cool back to −20° C.

Terephthaloyl chloride (90.60 g) was carefully added at a rate so as not to allow the mixture to rise above −10° C. The remaining acid chloride was transferred by washing with approximately 100 ml dichloromethane in three portions. 5,5'-Oxybis(2-(4-phenoxyphenyl)isoindoline-1,3-dione) (EIEIE) (82.20 g) was carefully added at a rate so as not to allow the mixture to rise above −10° C., causing the mixture to turn bright opaque orange. The remaining monomer was transferred by washing with approximately 50 ml dichloromethane in three portions. EKKE (1,4-bis(4-phenoxybenzoylbenzene) (140.00 g) was carefully added at a rate so as not to allow the mixture to rise above −5° C. The remaining monomer was transferred by washing with approximately 50 ml dichloromethane in three portions.

Lastly, 2,2,2-trifluoro-N-(4-phenoxyphenyl) acetamide (11.96 g) was added with its washings, together with the remaining dichloromethane. The stirrer speed was increased to 500 rpm and maintained over the reaction time. The nitrogen purge was removed and replaced with a water pump fitted with an air vent so as not to place the reaction system under vacuum. This was to trap and remove the hydrogen chloride evolved from the polymerization. The reaction mixture was slowly warmed to 5° C. then after 10 minutes to 20° C., where it was kept constant throughout the reaction time. After approximately 30 minutes all of the solids had dissolved forming an orange-red solution. After this point, dispersed polymer particles began to form. The reaction mixture was stirred rapidly for five hours. The reaction mixture was removed from the vessel via the bottom outlet.

The reaction mixture was removed from the reaction vessel and isolated by vacuum filtration through a sinter. The orange solid was decomplexed in approximately three litres of iced deionised water with stirring to produce a white particulate product.

The workup procedure for PEKK polymerization was carried out in a one litre reactor as follows:

Stand in deionised water overnight

Filtered and slowly added to 1.5 litres of stirred, hot deionised water to remove the residual dichloromethane Made up to 5 L with hot deionised water, 100 ml concentrated hydrochloric acid added, boiled for 1 hour, filtered, washed with 1 L deionised water, filtered 5 litres deionised water made to pH 13 with sodium hydroxide pellets, boiled for 1 hour, filtered, washed with 1 L deionised water, filtered 5 litres of deionised water, boiled for 1 hour, filtered, washed with 1 L deionised water, filtered 5 litres of deionised water, boiled for 1 hour, filtered, washed with 1 L deionised water, filtered 5 litres of deionised water, boiled for 1 hour, filtered, washed with 1 L deionised water, filtered Off-white PEKK powder isolated The IV of the resultant polymer was 0.75 dl/g.

Figure 2:
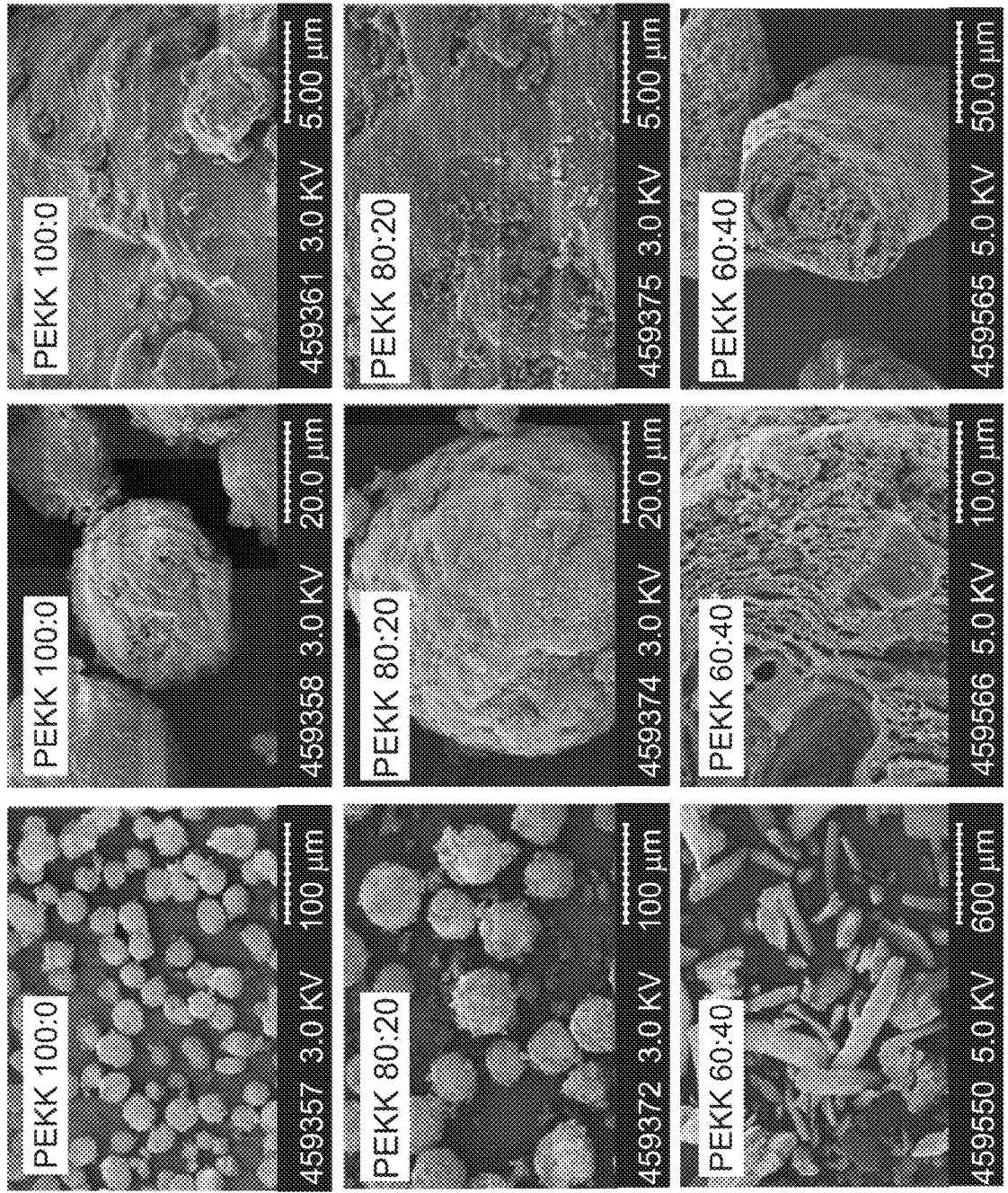
FIG. 2 provides scanning electron microscope (SEM) images of reactive end cap PEKK polymer particles with different T:I ratios.
Figure 3:
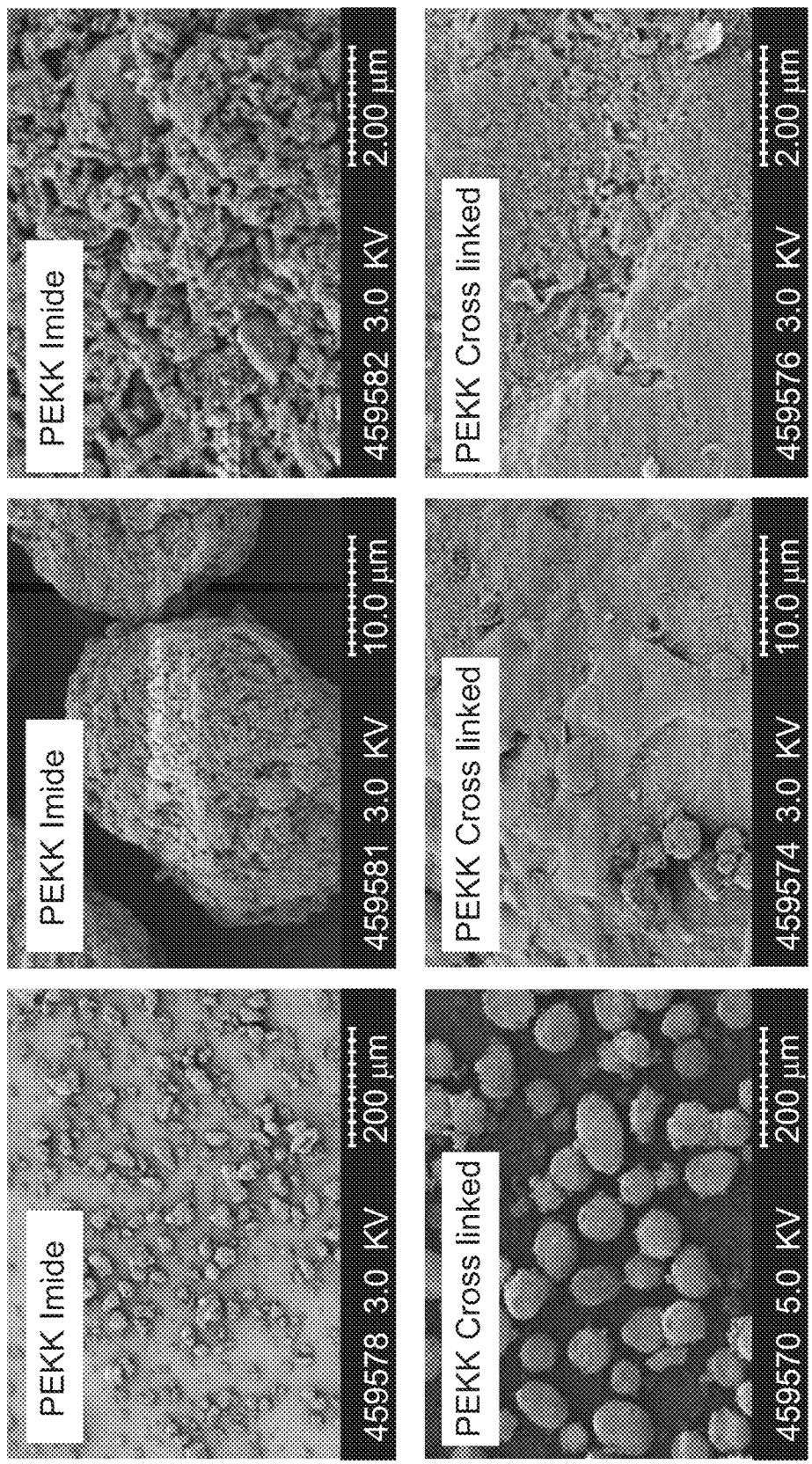
FIG. 3 provides SEM images of amine end capped co-polymer backbone PEKK imide and cross linked versions at different magnifications, showing size, shape, and surface features.

FIG. 2 shows the produced functionalized PEKK particles with different tere:iso (T:I) ratios, produced according to Examples 1 (100:0), 2 (80:20) and 3 (60:40). FIG. 3 shows co-polymer backbone PEKK imide and cross-linked versions produced according to Examples 4 and 5 at different magnifications showing size, shape, and surface features.

Figure 4:
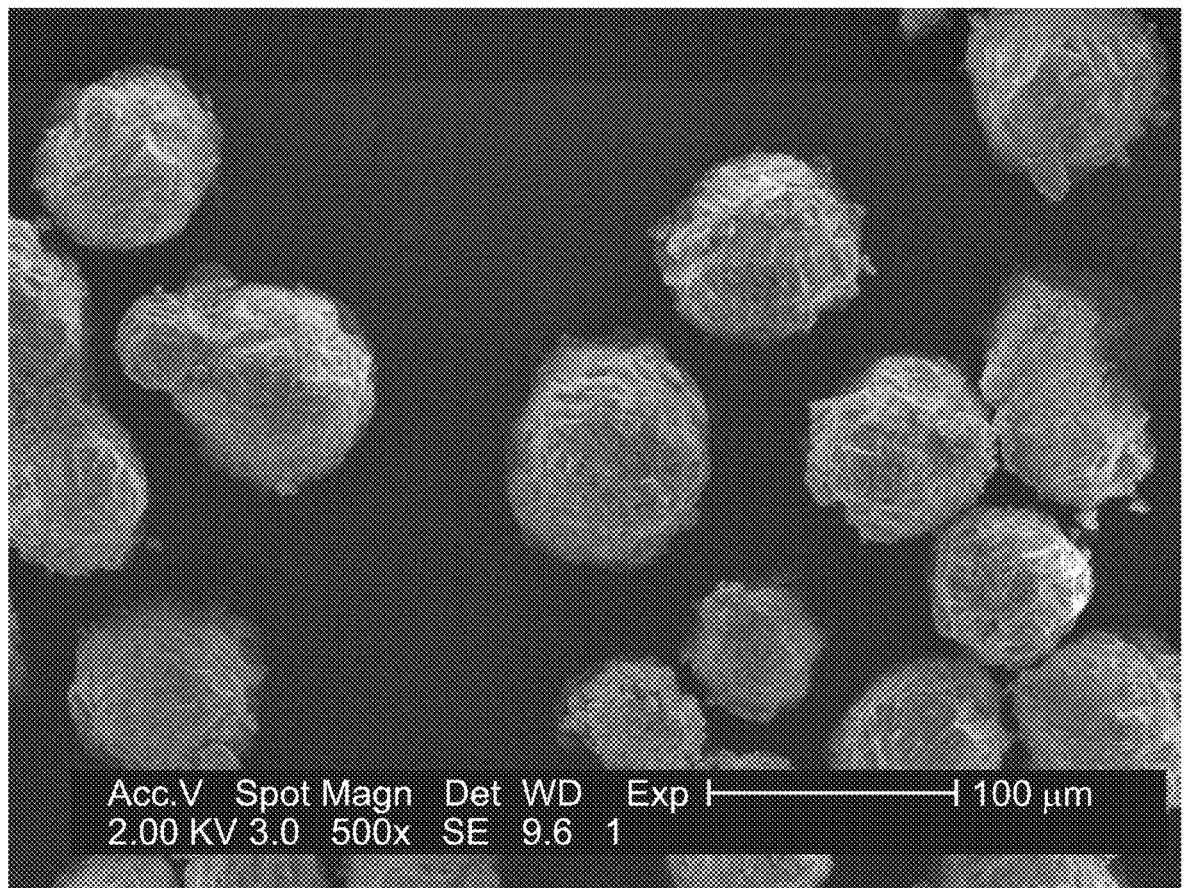
FIG. 4 is SEM image at 500× magnification of amine reactive end cap PEKK polymer particles with T:I ratio of 80/20.
Figure 5:
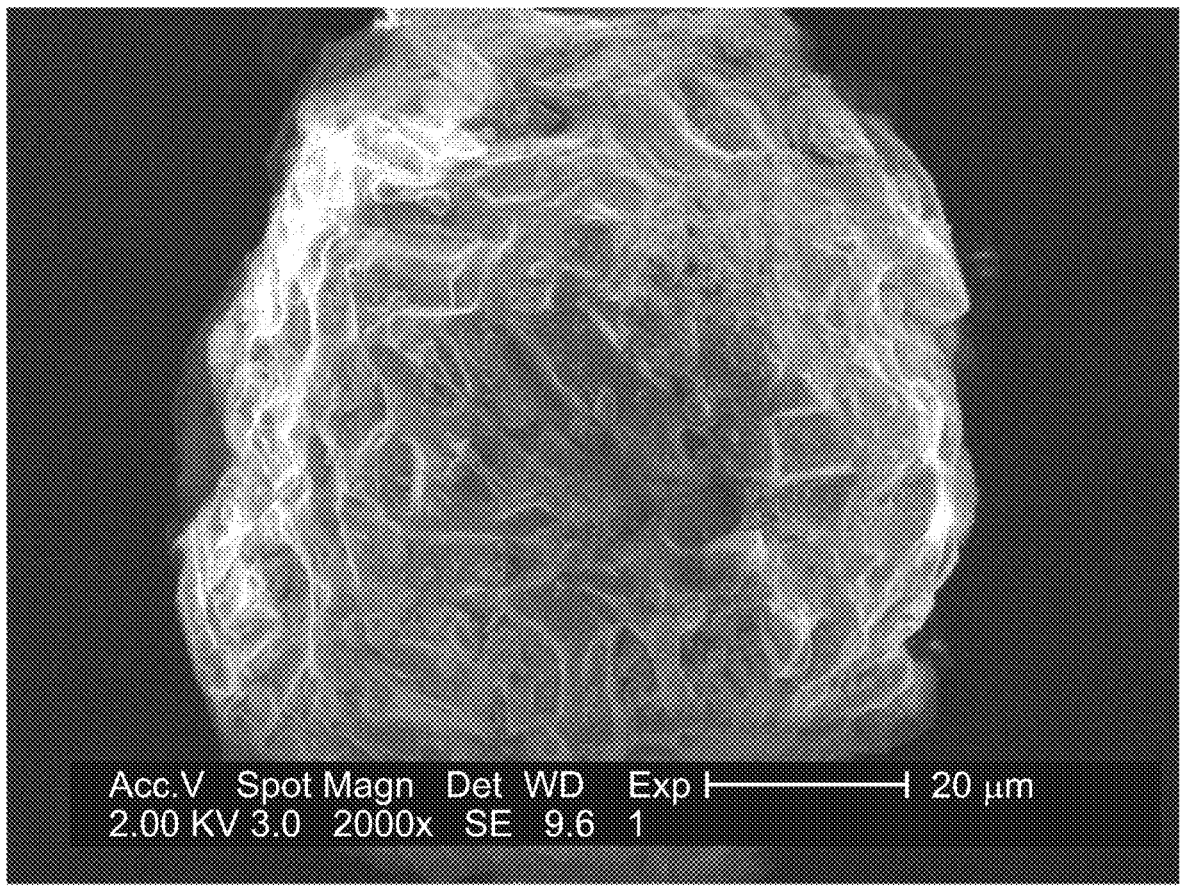
FIG. 5 is SEM image at 2000× of an amine reactive end cap PEKK polymer particle with T:I ratio of 80/20 showing surface features of the particle.

FIGS. 4 and 5 are scanning electron micrograph (SEM) images of amine reactive end cap PEKK polymer particles produced according to Example 2 with T:I ratio of 80:20 at 500× and 2000× magnification, respectively. These images show spherical particles that are on average 50-60 μm in diameter (as measured by laser diffraction) with some agglomeration of the particles as shown in FIG. 4. The surface features of the spherical particle as shown in FIG. 5 have characteristics similar to a "raisin" that the crevices and ridges were formed possibly due to contraction of the particle upon precipitating from solution.

Fabrication of Particle-Toughened Composite Panels

Example 6

A composite test panel was made by laying up 13 plies of carbon fiber/epoxy prepreg (fiber areal weight (FAW)=190 grams per square meter) without any particle toughener in it to form one-half of a lay-up. The carbon fiber/epoxy prepreg contained unidirectional, intermediate-modulus (IM) carbon fibers impregnated with an epoxy-based resin containing a dissolved thermoplastic toughening agent as described in Table 1. Wt % refers to weight percentage.

TABLE 1

| Component | Wt. % |
| --- | --- |
| PY306 epoxide | 23.59 |
| MY 0510 epoxide | 23.59 |
| Polyethersulfone 5003P | 15.08 |
| 4,4-diaminodiphenylsulfone (4,4-DDS) | 23.89 |
| PEKK particles | 13.85 |

A crack starter was inserted on top of the topmost ply and functionalized PEKK particles prepared according to Example 2 were screen printed over the rest of the topmost ply. An additional 13 plies of prepreg was laid over the existing lay-up. The final lay-up was enclosed in a vacuum bag, consolidated under pressure, and then cured. For comparison, a second composite panel was prepared in a similar manner except that unfunctionalized PEKK particles were used. Unfunctionalized PEKK particles were formed by jet milling PEKK polymer (Cypek®FC available from Cytec Industries Inc.) to a particle size with a D50 between 15 and 20 microns.

Figure 6:
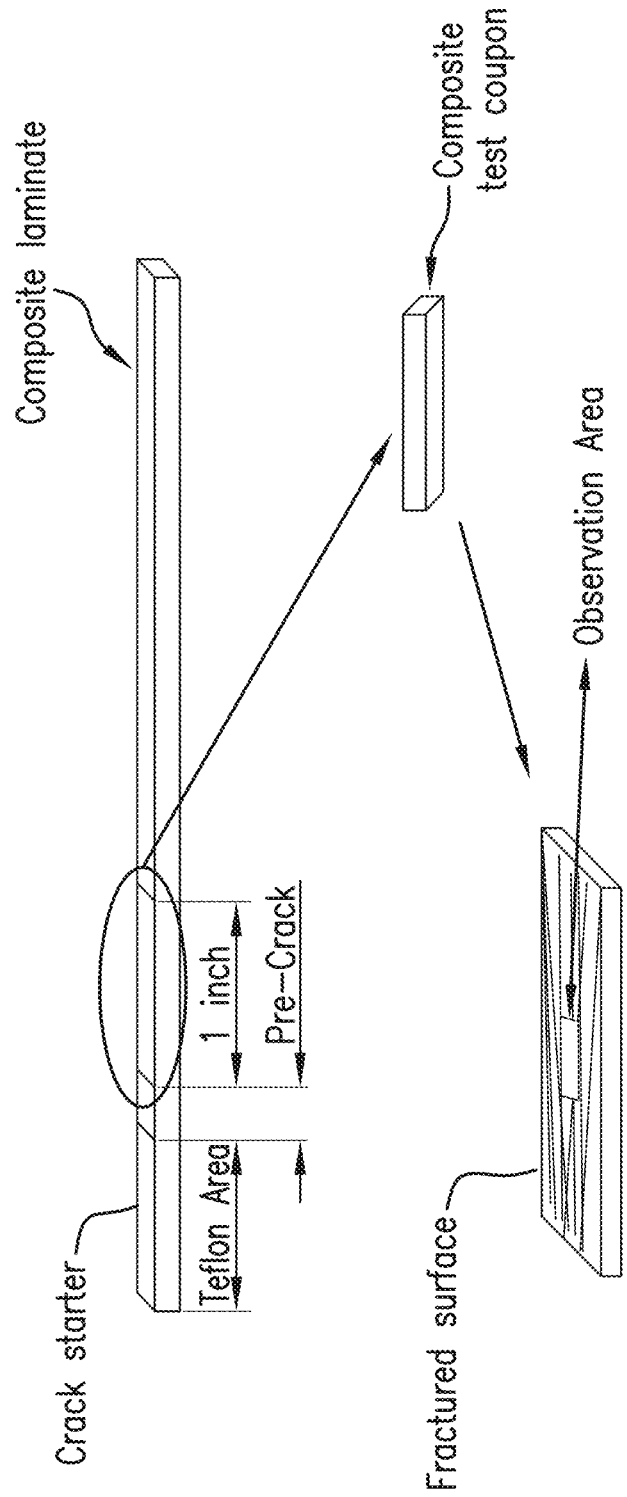
FIG. 6 is a diagram showing a fracture toughness specimen and location of SEM scan of fractured surface.

FIG. 6 is a diagram showing a fracture toughness specimen which was tested for $G_{IIC}$ fracture toughness and location of SEM scan of fractured surface. $G_{IIC}$ fracture toughness (End Notch Flexure) was measured by a modified version of ASTM D7905 wherein the inner two plies next to the crack starter are oriented +/−2 degrees to prevent fiber nesting.

Table 2 shows the $G_{IIC}$ (fracture toughness) results from testing the cured composite test panels containing the unfunctionalized and functionalized PEKK particles using the test method for $G_{IIC}$ fracture toughness described above. Table 3 shows that the $G_{IIC}$ value (crack 1) for the functionalized PEKK particles were almost twice that of the unfunctionalized PEKK particles.

TABLE 2

| Panel | Particle type | $G_{IIC}$ (KJ/m$^2$) |
| --- | --- | --- |
| 1 | Unfunctionalized PEKK | 1.331 |
| 2 | Functionalized PEKK | 2.634 |

Figure 7:
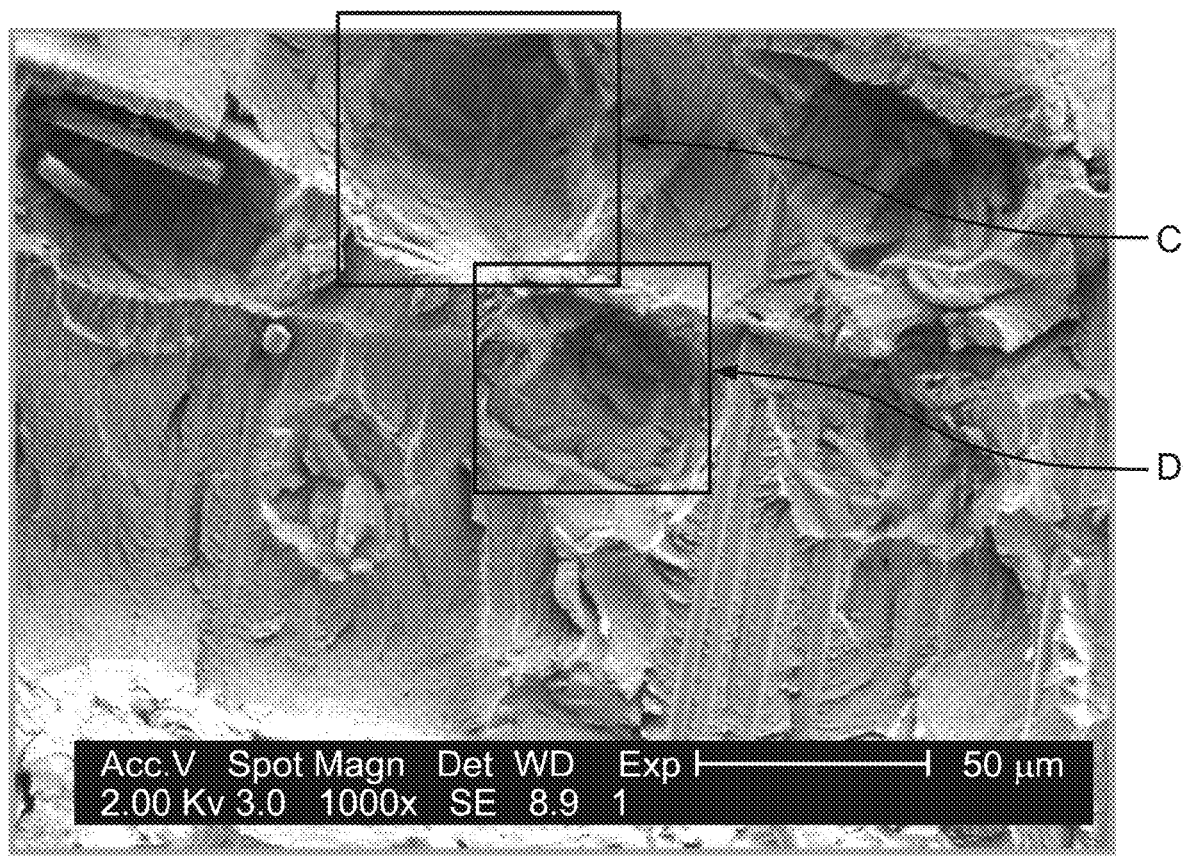
FIG. 7 is SEM image at 1000× of the $G_{IIC}$ coupon fracture surface of a carbon fiber/particle-toughened epoxy composite using amine-ended PEKK particle with T:I=80/20.

FIG. 7 is a SEM image at 1000× of the fracture surface of $G_{IIC}$ test coupon derived from carbon fiber/particle-toughened epoxy composite, which contained amine-ended PEKK particles with T:I=80/20 (prepared according to Example 2). Highlighted areas (C & D) show particle "pull out" and particle "fracture through" as crack propagates. The "fracture through" of the particles is evidence that reactive end groups have reacted with epoxy matrix. Particle "pull out" refers to an area of the fracture surface where the entire toughening particle has been pulled out leaving a crater; and particle "fracture through" refers to an area on the fracture surface where perimeter of the toughening particle can clearly be seen but the fracture went through the particle leaving a fragment in the crater.

Example 7

Functionalized PEKK polymer with T:I ratios of 80/20 and 100/0 with an out of balance (OOB) of 5% were made with the dispersion polymerization process described in Examples 1 and 2 having phenoxyaniline as the end cap after the trifluoroacetic acid group had been removed by the workup/deprotection procedure. The particle size range for the PEKK T:I=80/20 was 30 to 180 microns and for the PEKK T:I=100/0 was 15 to 800 microns. The particles were sieved through a 75 micron size mesh to remove particles larger than 75 microns. The average particle size was 60 and 45 microns respectively for the PEKK T:I=80/20 and PEKK T:I=100/0. Unfunctionalized PEKK polymer (Cypek® FC available from Cytec Industries Inc.) was finely ground to a particle size range in the 5 to 50 microns diameter with an average value between 15-20 microns to be used as the prepreg control to compare with the functionalized PEKK particles. The particle size range (or distribution) was determined by Malvern Mastersizer particle size analyser (laser diffraction). The functionalized and unfunctionalized PEKK particles were separately blended into an epoxy resin mix using the formulation in Table 3. Wt % refers to weight percentage.

TABLE 3

| Component | Wt. % |
| --- | --- |
| PY306 epoxide | 23.59 |
| MY 0510 epoxide | 23.59 |
| Polyethersulfone 5003P | 15.08 |
| 4,4-diaminodiphenylsulfone (4,4-DDS) | 23.89 |
| PEKK particles | 13.85 |

The resin mixtures were then cast into films onto a release paper. These cast films were then mated to IM7 (12K filaments) intermediate modulus carbon fiber in a hot melt uni-tape prepreg process with resin content being 35% and fiber areal weight (FAW) being 190 grams per square meter. The uni-tape prepreg was then cut to size and orientation to form individual plies, which were subsequently laid up and cured to make the mechanical test panels. The produced test panels were then subjected to the fracture toughness test described in Example 6, compression strength after impact (CAI) test (ASTM test method D7137), and open hole compression (OHC) test (ASTM test method D6484). OHC test specimens were moisture-conditioned by immersing specimens in a water bath set at 71° C. for 2 weeks and then testing at 82° C. The other tests were performed at room temperature under ambient conditions. Table 4 summarizes the test results for the IM7 carbon fiber reinforced particle toughened composites using unfunctionalized and functionalized PEKK particles. The functionalized particles showed an improvement of 24%-29% in CAI, 74% to 250% improvement in $G_{IIC}$ fracture toughness values (critical strain energy release rate), and 70% to 236% improvement in $G_{IIP}$ fracture toughness values (propagation strain energy release rate) while maintaining excellent hot/wet open hole compression strength due to the low moisture pick up of the PEKK polymer.

TABLE 4

CAI, fracture toughness, and OHC performance of carbon fiber reinforced particle toughened epoxy prepregs

| Test | Unfunctionalized PEKK | Functionalized PEKK T:I = 80/20 | Functionalized PEKK T:I = 100/0 |
|---|---|---|---|
| CAI (MPa) | 211.0 | 262.0 | 273.0 |
| $G_{IIC}$ (KJ/m2) | 1.03 | 1.79 | 2.56 |
| $G_{IIP}$ (KJ/m2) | 1.15 | 1.96 | 2.71 |
| 82° C. Wet OHC (MPa) | 375.8 | 359.2 | 365.4 |

Example 8

Functionalized PEKK polymer with T:I ratio of 60/40 with an out of balance (OOB) of 5% was made with the dispersion polymerization process described in Example 3 having phenoxyaniline as the end cap after the trifluoroacetic acid group had been removed by the workup/deprotection procedure. Functionalized PEKK polymer with T:I ratio of 80/20 that had 5% crosslink with an OOB of 5% was made by the dispersion polymerization procedure in Example 4 while amine end capped T:I=100/0 PEKK-EIEIE with 10% random co-polymer was made per the procedure outlined in Example 5. The particle size range for the PEKK T:I=60/40 was 3 to 1905 microns; for the PEKK T:I=80/20 with 5% crosslink was 2 to 240 microns; and for the T:I=100/0 PEKK-EIEIE with 10% random co-polymer was 5 to 832 microns. The particles were sieved through a 75 micron size mesh to remove particles larger than 75 microns. Unfunctionalized PEKK polymer (Cypek® FC) was finely ground to a particle size range in the 5 to 50 microns diameter with an average value between 15-20 microns was used as unfunctionalized PEKK particles. The particle size range (or distribution) was determined by using a Malvern Mastersizer particle size analyser (laser diffraction). The functionalized and unfunctionalized PEKK particles were separately blended into an epoxy resin mix using the formulation shown in Table 5. Wt % refers to weight percentage.

TABLE 5

| Component | Wt. % |
|---|---|
| PY306 epoxide | 24.65 |
| MY 0510 epoxide | 24.65 |
| Polyethersulfone 5003P | 15.08 |
| 4,4-diaminodiphenylsulfone (4,4-DDS) | 24.96 |
| PEKK particles | 10.00 |

The resin mixtures were then cast into films onto a release paper. These cast films were then mated to IM7 (12K filaments) intermediate modulus carbon fiber in a hot melt uni-tape prepreg process with resin content being 35% and fiber areal weight (FAW) being 190 grams per square meter. The uni-tape prepreg was then cut to size and orientation to form individual plies, which were subsequently laid up and cured to make the mechanical test panels. The produced test panels were then subjected to the same fracture toughness, compression strength after impact (CAI), and open hole compression (OHC) tests described in Example 7. Table 6 summarizes the test results for the particle-toughened composites using unfunctionalized and functionalized PEKK particles, crosslinked PEKK particles, and PEKK-EIEIE particles. The composites with functionalized particles showed an improvement relative to the composite with unfunctionalized particle control of 5 to 19% in CAI, 4% to 32% improvement in $G_{IIC}$ fracture toughness values (critical strain energy release rate), and 18 to 44% improvement in $G_{IIP}$ (propagation strain energy release rate) while maintaining excellent hot/wet open hole compression strength due to the low moisture pick up of the PEKK polymer.

TABLE 6

CAI, fracture toughness, and OHC performance of carbon fiber reinforced particle toughened epoxy prepregs with PEKK, cross linked PEKK, and PEKK-EIEIE particles

| Test | Unfunctionalized PEKK | Functionalized PEKK T:I = 60/40 | Functionalized PEKK T:I = 80/20 with 5% cross link | Functionalized T/I = 100/0 PEKK-EIEIE with 10% random co-polymer |
|---|---|---|---|---|
| CAI (MPa) | 242 | 287 | 272 | 253 |
| $G_{IIC}$ (KJ/m²) | 1.38 | 1.82 | 1.44 | 1.69 |
| $G_{IIP}$ (KJ/m²) | 1.69 | 2.43 | 1.99 | 2.05 |
| 82° C. Wet OHC (MPa) | 393 | 395 | 394 | — |

What is claimed is:
1. A method for fabricating a composite laminate, said method comprising:
  forming a plurality of prepregs, each prepreg comprising a layer of reinforcement fibers impregnated with a curable matrix resin and functionalized polymer particles of amine-functionalized polyaryletherketone (PAEK) positioned adjacent the layer of reinforcement fibers; and
  laying up the prepregs in a stacking arrangement such that an interlaminar region is defined between adjacent layers of reinforcement fibers, and the functionalized PAEK particles are positioned within said interlaminar region, wherein curable matrix resin comprises at least one thermoset resin, and
wherein the functionalized polymer particles are particles of an amine-functionalised polyaryletherketone polymer or copolymer thereof which are formed by:
(i) polymerizing monomers in a reaction medium comprising: (a) a capping agent containing —$NR_2$, —NRH or a protected amine group, where R is either an aliphatic or aromatic group, (b) a Lewis acid, and (c) a controlling agent selected from an aromatic carboxylic acid, an aromatic sulphonic acid, and a derivative thereof; and
(ii) adjusting the ratio of controlling agent to monomers so as to control particle size distribution,
wherein the monomers are represented by the following structure:

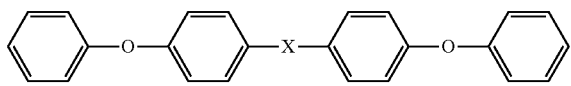

where X may be —C(O)—, —$S(O_2)$—, terephthaloyl group, isophthaloyl group, or an imide group with the following structure:

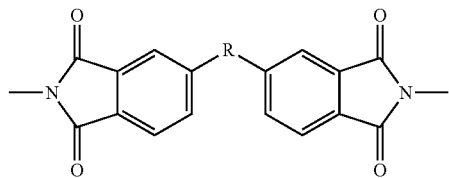

where R is —C(O)—, —$S(O_2)$—, —O—, or a bond.

2. The method of claim 1, wherein the functionalized polymer particles are substantially spherical in shape with an aspect ratio (R) of about 1 to 1.5.

3. The method of claim 1, wherein the functionalized polymer particles have diameter of less than 75 μm.

4. The method of claim 1, wherein the at least one thermoset resin in the curable matrix resin is selected from: epoxides, bismaleimide, and benzoxazine.

5. The method of claim 1, wherein the reinforcement fibers in each prepreg are unidirectional fibers.

6. The method of claim 1, wherein the reinforcement fibers in each prepreg are woven.

* * * * *